United States Patent
Nagamura et al.

(10) Patent No.: US 7,545,444 B2
(45) Date of Patent: Jun. 9, 2009

(54) RECEIVING APPARATUS AND TELEVISION SET FOR RECEIVING BROADCAST SIGNALS

(75) Inventors: Yoshihisa Nagamura, Osaka (JP); Takehiro Onomatsu, Osaka (JP)

(73) Assignee: Funai Electric Co., Ltd., Daito-shi, Osaka (JP)

( * ) Notice: Subject to any disclaimer, the term of this patent is extended or adjusted under 35 U.S.C. 154(b) by 512 days.

(21) Appl. No.: 10/940,124

(22) Filed: Sep. 14, 2004

(65) Prior Publication Data

US 2005/0066374 A1 Mar. 24, 2005

(30) Foreign Application Priority Data

Sep. 19, 2003 (JP) ............................ 2003-327309

(51) Int. Cl.
*H04N 5/46* (2006.01)
*H04N 5/50* (2006.01)

(52) U.S. Cl. .................... 348/731; 348/554; 348/555

(58) Field of Classification Search ............... 348/554, 348/555, 558, 706, 726, 731, 570, 732; 375/340; 455/337; 725/151
See application file for complete search history.

(56) References Cited

U.S. PATENT DOCUMENTS

| | | | | | |
|---|---|---|---|---|---|
| 5,422,682 | A | * | 6/1995 | Nakade et al. | 348/732 |
| 5,592,235 | A | * | 1/1997 | Park et al. | 348/555 |
| 5,598,221 | A | * | 1/1997 | Miyahara et al. | 348/554 |
| 5,774,194 | A | * | 6/1998 | Armbruster | 348/726 |
| 6,335,762 | B1 | * | 1/2002 | Lee | 348/558 |
| 6,421,098 | B1 | * | 7/2002 | Oya | 348/678 |
| 6,483,553 | B1 | * | 11/2002 | Jung | 348/731 |
| 6,486,925 | B1 | * | 11/2002 | Ko | 348/731 |
| 6,490,001 | B1 | * | 12/2002 | Shintani et al. | 348/554 |
| 6,519,298 | B1 | * | 2/2003 | Kim | 375/343 |

(Continued)

FOREIGN PATENT DOCUMENTS

| | | |
|---|---|---|
| JP | 11-355681 | 12/1999 |
| JP | 2001-285752 | 10/2001 |
| JP | 2003-219289 | 7/2003 |

OTHER PUBLICATIONS

Patent Abstracts of Japan, Publication No. 11-355681, publication date Dec. 24, 1999 (1 page).

(Continued)

*Primary Examiner*—Victor R. Kostak
(74) *Attorney, Agent, or Firm*—Osha • Liang LLP

(57) ABSTRACT

A broadcast receiving apparatus includes an NIM having a digital terrestrial wave processing unit for processing a received broadcast signal as required for digital terrestrial broadcast and a digital cable processing unit for processing a received broadcast signal as required for digital cable broadcast, and a signal acquisition determining circuit for determining whether a received broadcast signal is for digital terrestrial broadcast or digital cable broadcast, based on waveform characteristic of the received broadcast signal. A CPU causes selected one of the digital terrestrial processing unit and the digital cable processing unit of the NIM to execute the signal processing, based on acquisition result information of the signal acquisition determining circuit.

14 Claims, 6 Drawing Sheets

U.S. PATENT DOCUMENTS

| | | | |
|---|---|---|---|
| 6,721,018 B1 * | 4/2004 | Shintani et al. | 348/731 |
| 6,894,340 B2 * | 5/2005 | Kuo et al. | 257/315 |
| 7,061,549 B1 * | 6/2006 | Mabon | 348/731 |
| RE39,202 E * | 7/2006 | Gurantz | 725/71 |
| 7,102,692 B1 * | 9/2006 | Carlsgaard et al. | 348/572 |
| 2001/0033625 A1 * | 10/2001 | Ninomiya et al. | 375/316 |
| 2002/0186327 A1 * | 12/2002 | Inui et al. | 348/732 |
| 2004/0207764 A1 * | 10/2004 | Naoi et al. | 348/732 |

OTHER PUBLICATIONS

Notice of Grounds of Rejection for Patent Application No. 327309/2003, Mailed Sep. 30, 2008, 6 pages.

English Abstract from esp@cenet.com, for JP2001285752, Publication Date: Oct. 12, 2001, 1 page.

English Abstract from esp@cenet.com, for JP2003219289, Publication Date: Jul. 31, 2003, 1 page.

* cited by examiner

FIG.2

| 40:CHANNEL NO. | 41:TUNING INFORMATION | 42: TUNABILITY |
|---|---|---|
| CH3 | × × | TUNABLE |
| CH5 | × × × | UNTUNABLE |
| CH7 | × × △ | TUNABLE |
| CH9 | × × ○ | UNTUNABLE |
| ⋮ | ⋮ | ⋮ |
| CH40 | × × ○○ | UNDECIDED |
| CH41 | × × ○ × | UNDECIDED |
| ⋮ | ⋮ | |
| CH50 | × × ○△ | UNDECIDED |

TB1, TB2, TB3, TB4

8VSB SIGNAL

QAM SIGNAL

# RECEIVING APPARATUS AND TELEVISION SET FOR RECEIVING BROADCAST SIGNALS

BACKGROUND OF THE INVENTION

1. Field of the Invention

The present invention relates to a receiving apparatus and a TV (Television) set equipped with the same. More particularly, the invention relates to a receiving apparatus for a TV broadcast signal that can be used by both terrestrial broadcast and cable television (CATV) broadcast at the same time, and a TV set equipped with the same.

2. Description of the Background Art

Japanese Patent Laying-Open No. 11-355681, for example, discloses a receiving apparatus which can be used for both terrestrial broadcast and CATV broadcast and which can especially receive both analog TV broadcast and DTV (Digital Television) broadcast.

The receiving apparatus disclosed in Japanese Patent Laying-Open No. 11-355681 includes, to permit the sharing of the same cable for the CATV broadcast and the terrestrial broadcast, a signal input terminal for the terrestrial broadcast signal received by an antenna, a frequency converting part, a NTSC (National Television System Committee) demodulating circuit, a VSB (Vestigial Sideband) demodulating circuit, a QAM (Quadrature Amplitude Modulation) demodulating circuit, and a CATV broadcast signal input terminal. The input signal from one of the two input terminals is selectively switched and frequency converted into an intermediate frequency signal, which is selectively applied directly to the NTSC demodulating circuit, the VSB demodulating circuit or the QAM demodulating circuit. The selective switching operation is performed based on the tuning data signal specifying a broadcast station to be selected.

In this way, the signal processing system is switched based on the tuning data signal specifying a selected broadcast station; therefore, the proper receiving operation is impossible without applying some tuning data signal for discriminating the processing system from an external source.

SUMMARY OF THE INVENTION

An object of the present invention is to provide a receiving apparatus which determines whether a received broadcast signal is for terrestrial broadcast or CATV broadcast, and a television set equipped with the same.

In order to achieve the above object, according to an aspect of the present invention, there is provided a receiving apparatus including: a digital terrestrial wave processing unit for processing a received broadcast signal as required for digital terrestrial broadcast; a digital cable processing unit for processing a received broadcast signal as required for digital cable broadcast; a determining unit for determining whether the received broadcast signal is for the digital terrestrial broadcast or for the digital cable broadcast, based on the waveform characteristic of the received broadcast signal; and a control unit. The control unit causes selected one of the digital terrestrial wave processing unit and the digital cable processing unit to execute the signal processing based on result of determination of the determining unit.

Accordingly, in the receiving apparatus capable of receiving selected one of the digital terrestrial broadcast and the digital cable broadcast, the determining unit determines whether the received signal is for the digital terrestrial broadcast or the digital cable broadcast based on the waveform characteristic of the received broadcast signal, and based on the result of determination, causes selected one of the digital terrestrial wave processing unit and the digital cable processing unit to process the signals.

Therefore, the receiving apparatus capable of receiving selected one of the digital terrestrial wave broadcast and the digital cable broadcast can determine, by itself without any external instruction, whether the received broadcast signal is for the terrestrial broadcast or the CATV broadcast, and can process the signals correspondingly.

The user, who may switch between the terrestrial broadcast and the cable broadcast by changing the cable, is not required to notify the receiving apparatus of the switching operation and, therefore, can conveniently perform the operation.

Preferably, the waveform characteristic corresponds to the type of modulation of the broadcast signal. The digital terrestrial broadcast and the digital cable broadcast use different modulation schemes for the broadcast signals. From the waveform characteristic of the received broadcast signal, therefore, the modulation scheme of the broadcast signal, i.e., whether the terrestrial broadcast or the cable broadcast is involved can be determined.

Preferably, the receiving apparatus further includes an analog processing unit for processing a received broadcast signal as required for analog broadcast. The control unit causes the analog processing unit to execute selected one of the signal processing for the analog terrestrial broadcast and the signal processing for the analog cable broadcast, based on the result of determination by the determining unit.

In the case where the same receiving apparatus is adapted to receive the digital broadcast signal and the analog broadcast signal, therefore, the determining unit can determine whether the analog broadcast signal is received by the terrestrial wave or by the cable broadcast. In accordance with this determination, the signal processing for the analog terrestrial broadcast or the signal processing for the analog cable broadcast is executed. In this way, the analog broadcast signal can be received and processed.

Preferably, the signal processing includes a tuning process. Therefore, the determining unit can determine whether the broadcast signal to be tuned is received by the terrestrial wave broadcast or by the cable broadcast. In accordance with this determination, the tuning process for the terrestrial broadcast or the tuning process for the cable broadcast is executed. Thus, the tuning process can be executed at higher speed than in the case where the tuning process for the terrestrial broadcast and the tuning process for the cable broadcast are both executed as it is unknown whether the terrestrial wave broadcast is received or the cable broadcast is received.

Preferably, the tuning process is executed for all channels. Even in the case where the tuning process is executed for all channels, therefore, the tuning process for the terrestrial broadcast or the tuning process for the cable broadcast is selectively executed in accordance with the determination by the determining unit. Thus, the tuning process can be executed at higher speed than in the case where the tuning process for the terrestrial broadcast and the tuning process for the cable broadcast are both executed as it is unknown whether the terrestrial wave broadcast or the cable broadcast is received. Also, even in the case where the tuning process is executed for all channels, the user waiting time can be shortened.

Preferably, the tuning process is executed for one desired channel. Even in the normal tuning operation including the direct tuning or the up-down tuning for designating the channel directly, the tuning process is selectively executed for the terrestrial broadcast or the cable broadcast in accordance with the determination by the determining unit. Thus, the tuning process can be executed at higher speed than in the case where the tuning process for the terrestrial broadcast and the tuning process for the cable broadcast are both executed as it is unknown whether the terrestrial wave broadcast or the cable broadcast is received.

Even in the case where the user watching a program by the broadcast signal changes the channel for another program, the tuning process for the terrestrial broadcast or the tuning process for the cable broadcast is only executed in accordance with the result of determination of the determining unit. Thus, the waiting time can be shortened from the channel change to the time when the new program can be watched on the new channel.

Preferably, the signal processing includes a process of converting the broadcast signal which has been subjected to the tuning process into a signal viewable through a television receiver which has been prepared in advance, and the receiving apparatus and the television receiver are integrally configured.

Thus, a TV set equipped with the receiving functions having the features described above can be realized.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIG. 2 is a diagram showing an example of a table configuration according to an embodiment of the present invention;

DESCRIPTION OF THE PREFERRED EMBODIMENTS

Figure 1:
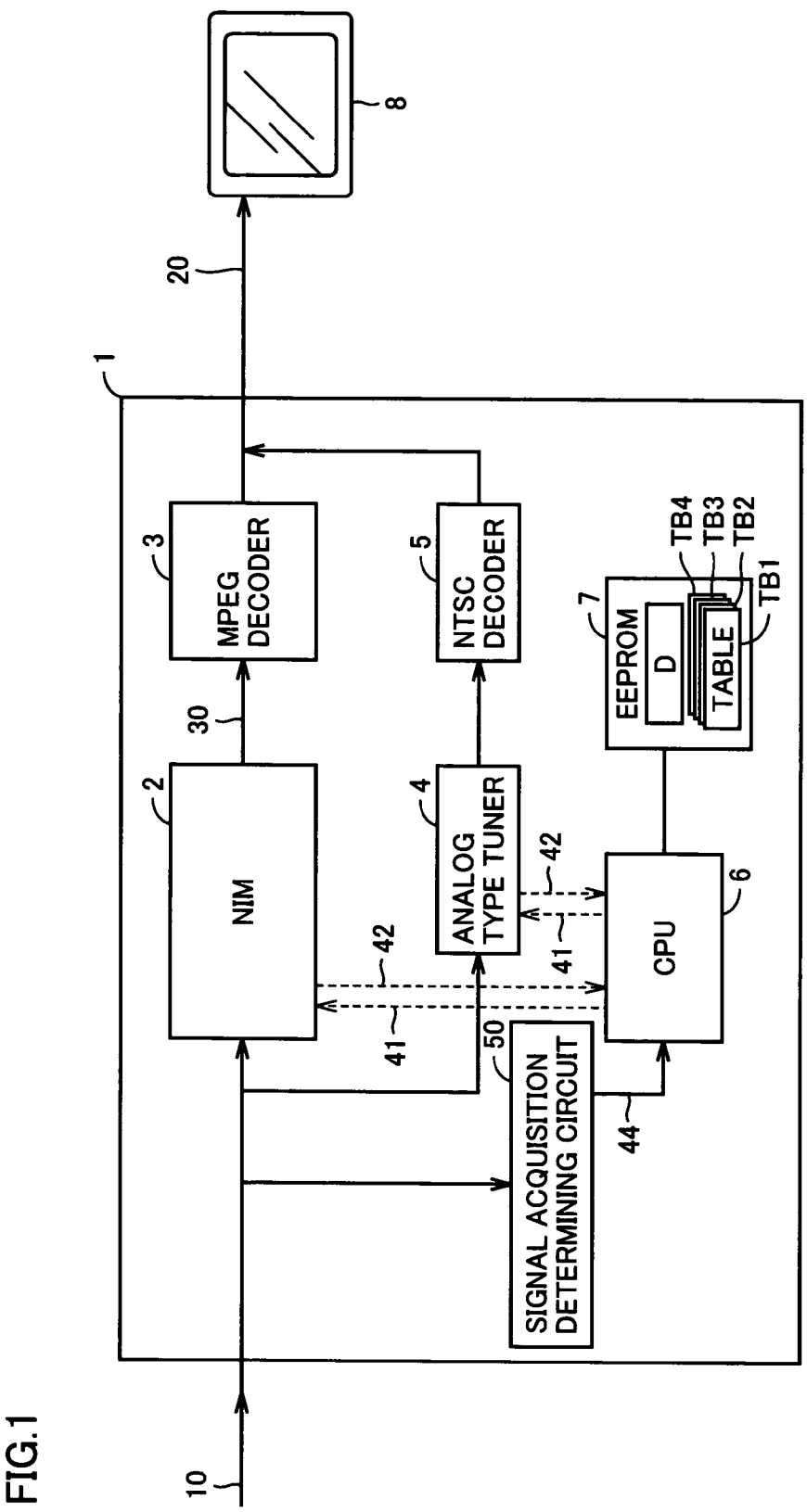
FIG. 1 shows a configuration of a broadcast receiving apparatus according to an embodiment of the present invention.

The configuration of a broadcast receiving apparatus 1 according to an embodiment of the invention is shown in FIG. 1. Broadcast receiving apparatus 1 is supplied with and processes a RF (Radio Frequency) signal 10 constituting a high-frequency signal from an input terminal (not shown), and outputs to an externally connected TV receiver 8 a video signal 20, whereby the received broadcast can be viewed on TV receiver 8. Broadcast receiving apparatus 1 is shown as a STB (Set Top Box) arranged separately from TV receiver 8. Alternatively, broadcast receiving apparatus 1 may be a TV set in which broadcast receiving apparatus 1 is built in TV receiver 8. Also, the analog TV broadcast signal, which is shown as the NTSC signal according to the NTSC scheme, is not limited to the NTSC signal.

Referring to FIG. 1, broadcast receiving apparatus 1 includes a processing unit for the DTV broadcast, a processing unit for the analog broadcast of the NTSC signal, a CPU (Central Processing Unit) 6 for controlling the various parts of broadcast receiving apparatus 1, an EEPROM (Electrically Erasable and Programmable Read Only Memory) 7 for storing data including connection determining data D and tables TB1 to TB4 and a signal acquisition determining circuit 50.

The processing unit for the DTV broadcast includes a NIM (Network Interface Module) 2 for processing RF signal 10 supplied thereto and outputting TS (Transport Stream) data 30 adapted to be processed by the computer, and a MPEG (Motion Picture Experts Group) decoder 3 supplied with and decoding TS data 30 according to the MPEG scheme and outputting a video signal 20. The processing unit for the analog TV broadcast, on the other hand, includes an analog type tuner 4 supplied with RF signal 10 for performing the tuning operation, and a NTSC decoder 5 for decoding the broadcast signal extracted by the tuning operation of analog type tuner 4 according to the NTSC scheme and outputting video signal 20.

Broadcast receiving apparatus 1 is adapted to be supplied with one of the RF signal for the terrestrial broadcast and the RF signal for the CATV broadcast as RF signal 10.

Connection determining data D of EEPROM 7 indicates whether RF signal 10 is supplied for the terrestrial broadcast or the CATV broadcast. Specifically, connection determining data D indicates whether broadcast receiving apparatus 1 is connected with a device (antenna) for receiving the terrestrial broadcast or a device (cable) for receiving the CATV broadcast.

Tables TB1 to TB4 correspond to, for example, the digital terrestrial broadcast according to ATSC (Advanced Television Systems Committee), the digital CATV broadcast, the analog terrestrial broadcast and the analog CATV broadcast, respectively. Tables TB1 to TB4 have a similar configuration as shown in FIG. 2; therefore, only table TB1 will be described herein.

Table TB1 includes a channel number 40 indicating the channel of each broadcast station transmitting the corresponding TV broadcast signal, i.e., a plurality of different broadcast channels, tuning information 41 and a tunability data 42 corresponding to each channel number 40. Tuning information 41 is read by CPU 6 and is applied to NIM 2 or analog type tuner 4. Thus, NIM 2 or analog type tuner 4 supplies to CPU 6 with tunability data 42 indicating the tunability as to whether the tuning operation was performed successfully based on available tuning information 41, i.e., whether the broadcast signal in the frequency band (the channel corresponding to tuning information 41) indicated in tuning information 41 could be extracted from input RF signal 10. Tuning information 41 read from tables TB1, TB2 is applied to NIM 2, while tuning information 41 read from tables TB3, TB4 is applied to analog type tuner 4.

Figure 3:
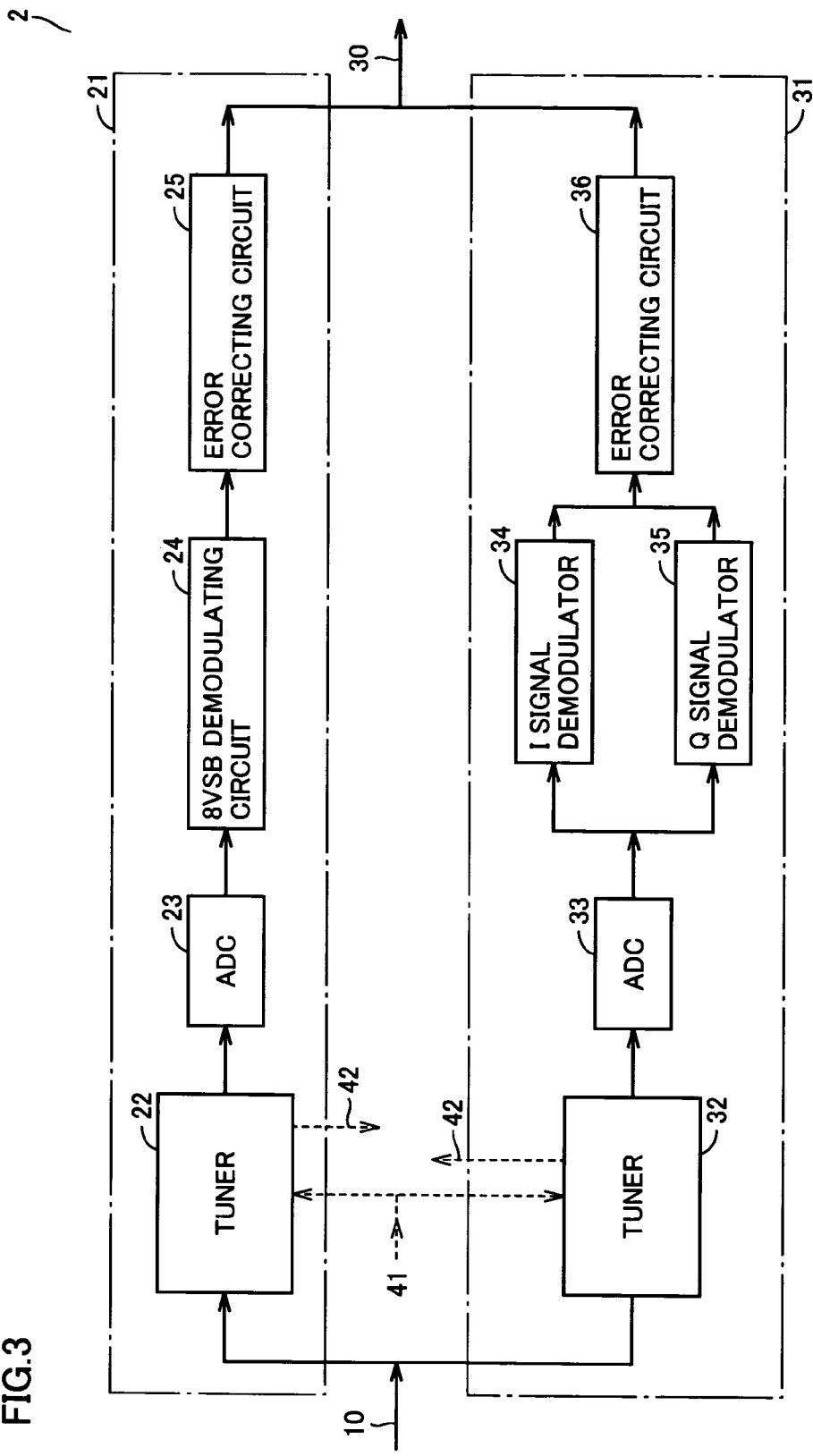
FIG. 3 shows a NIM configuration according to an embodiment of the present invention.

FIG. 3 shows an example configuration of NIM 2 according to an embodiment of the present invention. Referring to FIG. 3, NIM 2 includes an 8VSB demodulator 21 for the digital terrestrial broadcast signal modulated in accordance with 8VSB and a QAM demodulator 31 for the digital CATV broadcast signal modulated in accordance with QAM.

8VSB demodulator 21 includes a tuner 22 supplied with RF signal 10 for extracting and outputting a signal of the frequency of a specified channel based on tuning information 41, an ADC (Analog Digital Converter) 23 for converting the analog signal outputted by tuner 22 into a digital signal, an 8VSB demodulating circuit 24 for demodulating the digital signal outputted by ADC 23 in accordance with 8VSB, and an error correcting circuit 25 supplied with the digital signal outputted by 8VSB demodulating circuit 24 for executing a predetermined error correcting process and outputting TS data 30.

8VSB demodulating circuit 24, upon receipt of the digital signal, removes the pilot signal used for synchronization of the signals between the transmitting and receiving ends from the input signal and also removes, by an equalizer (not shown), the phase shift of the input signal from which the pilot signal is removed. After that, the same input signal is outputted to error correcting circuit 25. Error correcting circuit 25 restores the trellis, data interleave, Reed-Solomon and the data randomize codes of the input signal used at the transmitting end and, thereby, retrieves TS data 30 from the input signal.

QAM demodulator 31 includes a tuner 32 for extracting and outputting the radio frequency signal of the channel designated by tuning information 41 from RF signal 10, an ADC 33 for outputting by converting the radio frequency signal of the analog signal outputted by tuner 32 into a digital signal, an I signal demodulator 34 and a Q signal demodulator 35 supplied with the digital signal from ADC 33 and demodulating the input signal in accordance with QAM, and an error correcting circuit 36 for correcting the error of the signal demodulated by the demodulators and outputting TS data 30.

The QAM is a digital modulation scheme in which two orthogonal carriers having a phase difference of 90 degrees are changed in amplitude and added to each other for high-efficiency transmission. The 8VSB, on the other hand, is an amplitude modulation scheme in which one carrier signal is subjected to the 8-level amplitude change. Thus, according to QAM, two components including the phase (I) and the quadrature (Q) are required to be extracted. Therefore, a demodulator is provided for each corresponding component. The contents of the correction by error correcting circuit 36 are substantially the same as those of error correcting circuit 25.

Figure 4A:
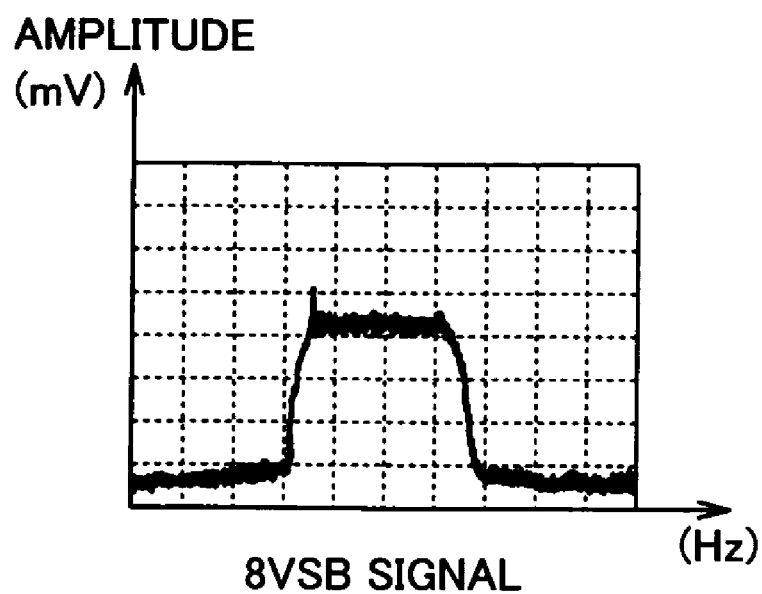
FIGS. 4A and 4B show spectrum waveforms of the RF signal of the 8VSB signal and the QAM signal.
Figure 4B:
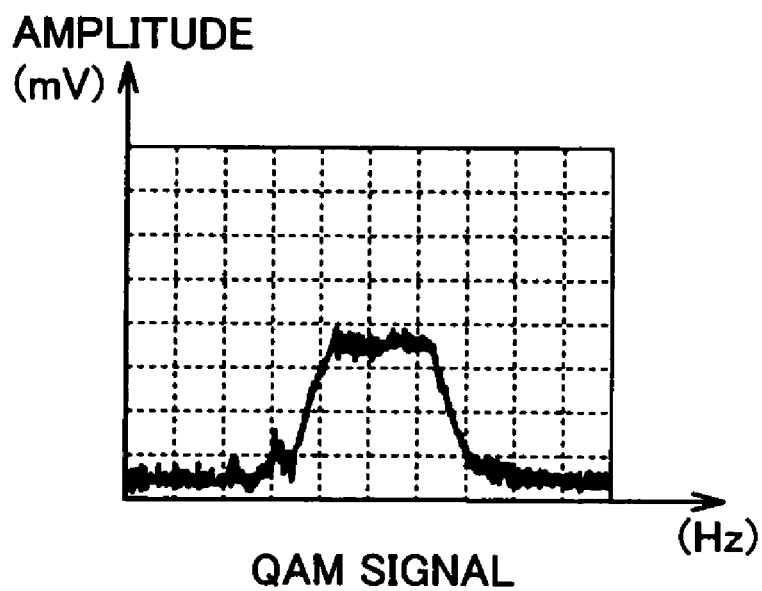

FIG. 4A shows a waveform of RF signal 10 modulated in accordance with 8VSB, and FIG. 4B shows a waveform of RF signal 10 modulated in accordance with QAM. In the 8VSB scheme shown in FIG. 4A, the information can be transmitted at the rate of 3 bits per symbol. The QAM shown in FIG. 4B includes 16QAM and 64QAM. In 16QAM, the information is transmitted at the rate of 4 bits per symbol, while in 64QAM, the information is transmitted at the rate of 6 bits per symbol. The more the amplitude is segmented into detailed levels, the greater the amount of data that at the sacrifice of a higher probability of an error due to noises. For this reason, the QAM is a modulation scheme used for the CATV having comparatively favorable transmission conditions. In the graphs of FIGS. 4A, 4B showing waveforms, the abscissa represents the frequency (Hz) of RF signal 10 and the ordinate the amplitude (mV).

Upon detection of a waveform spectrum unique to the 8VSB modulation of FIG. 4A with the pilot signal detected at predetermined intervals in RF signal 10 inputted to broadcast receiving apparatus 1, signal acquisition determining circuit 50 in FIG. 1 outputs acquisition result information 44 indicating the successful acquisition of the 8VSB signal. Upon detection of the waveform spectrum unique to the QAM modulation in FIG. 4B, on the other hand, acquisition result information 44 indicating the successful acquisition of the QAM signal is outputted. Though not shown, upon detection of a waveform spectrum unique to the NTSC signal, acquisition result information 44 indicating the successful acquisition of the NTSC signal is outputted. In the case where none of these waveform spectra can be detected, acquisition result information 44 indicating the acquisition failure is outputted. Acquisition result information 44 thus output is applied to CPU 6.

Broadcast receiving apparatus 1 according to this embodiment is capable of an auto scan operation in which the (receiving) channel is individually assigned to the broadcast signal of a broadcasting station that can be received. Broadcast receiving apparatus 1 can receive all of the digital terrestrial broadcast, the digital CATV broadcast, the analog terrestrial broadcast and the digital CATV broadcast. Prior to the auto scan operation, therefore, broadcast receiving apparatus 1 determines the manner in which the antenna or cable, as the case may be, is connected to receive the broadcast signal of any one of the terrestrial broadcasts and the CATV broadcasts, and is required to carry out the auto scan operation in accordance with the determined connection mode. In view of this, once the mode is shifted to auto scan, broadcast receiving apparatus 1 automatically recognizes the connection mode in accordance with the flowchart shown in FIG. 5.

Upon receipt of an instruction to start the auto scan from a remote controller and the like (not shown), CPU 6 sets the connection determining data D to "undecided" and stores in EEPROM 7 (steps (hereinafter, abbreviated as S) 1 and 2 in FIG. 5). After that, the channel to be selected is decided (S3) and connection determining data D is checked (S4). The result of check shows that connection determining data D is not decided ("undecided" in S4), and therefore tuning information 41 of channel number 40 in table TB1 of the digital terrestrial broadcast corresponding to the selected channel decided in step S3 is read and applied to tuner 22. Thus, tuner 22 selects the channel accordingly. (S5).

The tuning (or the tuning process) is defined as the extraction of the signal in a predetermined frequency band from RF signal 10 based on tuning information 41. The extracted signal corresponds to the broadcast signal of the channel having channel number 40 corresponding to tuning information 41. Tuners 22, 32 and analog type tuner 4 execute the tuning process and output tunability data 42 to CPU 6. Tunability data 42 indicates "tunable" upon successful extraction of the signal in the predetermined frequency band based on tuning information 41, or otherwise "untunable". In auto scan mode, CPU 6 stores inputted tenability data 42 in one of tables TB1 to TB4 from which tuning information 41 is desired to read, as a data corresponding to tuning information 41.

In the tuning process of step S5, signal acquisition determining circuit 50, upon detection of the spectrum pattern shown in FIG. 4A from RF signal 10, outputs acquisition result information 44 indicating the successful acquisition of the digital terrestrial broadcast signal to CPU 6 (S6). Thus, CPU 6 sets connection determining data D to "terrestrial wave" based on input acquisition result information 44 and stores it in EEPROM 7 (S7, S8).

After that, CPU 6 determines whether the auto scan operation has been completed for all the channels or not (S16). Unless so completed, the next channel is decided (S3), and connection determining data D is checked (S4). Connection determining data D indicates "terrestrial" (YES in S13). Therefore, CPU 6 reads tuning information 41 of the channel number 40 corresponding to the decided channel from the table TB1, and applies it to tuner 22 of NIM 2. Thus, tuner 22 starts the tuning process (S14).

After that, connection determining data D of EEPROM 7 indicates "terrestrial". Until all the channels are selected (YES in S16) while deciding the channel in S3, the tuning process (S14) is repeated by tuner 22 based on tuning information 41 corresponding to channel number 40 of the channel decided in table TB1.

In the case where acquisition result information 44 indicates the acquisition failure (NO in S6), on the other hand, CPU 6 searches table TB2 for the determined channel, reads tuning information 41 of corresponding channel number 40 and applies it to tuner 32. Thus, the tuning process for the digital CATV broadcast is executed by tuner 32 (S9). In the case where acquisition result information 44 indicates the successful acquisition (YES in S10), on the other hand, CPU 6 sets connection determining data D to "cable" and stores it in EEPROM 7 (S11, S12). Then, through the process of step S16, the next channel is determined (S3).

Connection determining data D is checked (S4). Since "cable" is indicated (NO in S13), CPU 6 searches table TB2 based on the decided channel, reads tuning information 41 of corresponding channel number 40, and applies it to tuner 32. As a result, tuner 32 executes the tuning process (S15). After that, the process proceeds to step S16.

As described above, the channel is determined while being sequentially updated, and tuner 22 or 32 is caused to execute the tuning process based on tuning information 41 corresponding to the determined channel, and based on acquisition result information 44 obtained in the process, connection determining data D is decided. Upon completion of the process shown in S5 to S15 for all the channels (YES in S16), the value indicated by the connection determining data D is "terrestrial", "cable" or "undecided". As a result, connection determining data D indicates a specific mode of connection of broadcast receiving apparatus 1 (the connection mode for receiving the terrestrial broadcast, the connection mode for receiving the CATV broadcast or the connection mode not determined).

Broadcast receiving apparatus 1 has a configuration capable of receiving also the NTSC signal providing an analog broadcast signal. Therefore, the auto scan operation for the NTSC signal is started. Specifically, CPU 6, based on connection determining data D, determines whether the NTSC signal is received as terrestrial broadcast or as CATV broadcast (S37). In the connection determining data D indicates "terrestrial" (YES in S38), all the channels are scanned for the NTSC signal of the terrestrial broadcast (S39). In the case where "cable" is indicated (NO in S38), all the channels are scanned for the NTSC signal of the CATV broadcast (S40). In the case where "undecided" is the indication ("undecided" in S37), the process according to the existing tuning method is executed (S41). After that, the series of auto scan operation is terminated.

In first scanning all the channels of the NTSC signal for the terrestrial broadcast (S39), CPU 6 reads corresponding tuning information 41 for each channel indicated by channel number 40 in table TB3 and applies it to analog type tuner 4. Analog type tuner 4 executes the tuning process based on tuning information 41 thus obtained. This process is executed completely for all the channels of channel number 40 registered in table TB3. Upon completion of this process, the scan operation for the channels of the NTSC signal of the terrestrial broadcast is completed.

In first scanning all the channels of the NTSC signal for the CATV broadcast (S40), on the other hand, CPU 6 reads corresponding tuning information 41 for each channel indicated by channel number 40 in table TB4 and applies it to analog type tuner 4. The subsequent process is similar to that of the full-channel scan (S39) of the NTSC signal of the terrestrial broadcast. This process is executed for all the channels of channel number 40 registered in table TB4. Upon completion of this process, the scan operation for all the channels of the NTSC signal of the CATV broadcast is completed.

As long as connection determining data D indicates "undecided", the connection mode is still unknown, and therefore the conventional tuning process for the analog broadcast signal including the process of steps S39, S40 is executed (S41).

As described above, in spite of the fact that broadcast receiving apparatus 1 is capable of receiving both the terrestrial broadcast and the CATV broadcast, the connection mode is determined by broadcast receiving apparatus 1 beforehand in the auto scan operation of the analog broadcast signal. In this way, based on connection mode data D, the auto scan (S40) by the CATV broadcast or the auto scan (S39) by the terrestrial broadcast is selectively executed. As compared with the case in which the auto scan operation of the analog broadcast signal is performed for both the terrestrial broadcast and the CATV-broadcast due to the "undecided" state of the connection mode, therefore, the auto scan operation of the analog broadcast signal is improved in speed.

Next, the normal tuning process for watching a program through TV receiver 8 is explained with reference to the flowchart of FIG. 6. In the case where the user changes the channel of the program watched on TV receiver 8 by manipulating the remote controller not shown, an instruction to change the channel is given to CPU 6. CPU 6 is supplied with the data of the channel (after change) designated in the instruction (S20), and checks connection determining data D stored in EEPROM 7 (S21).

Figure 5:
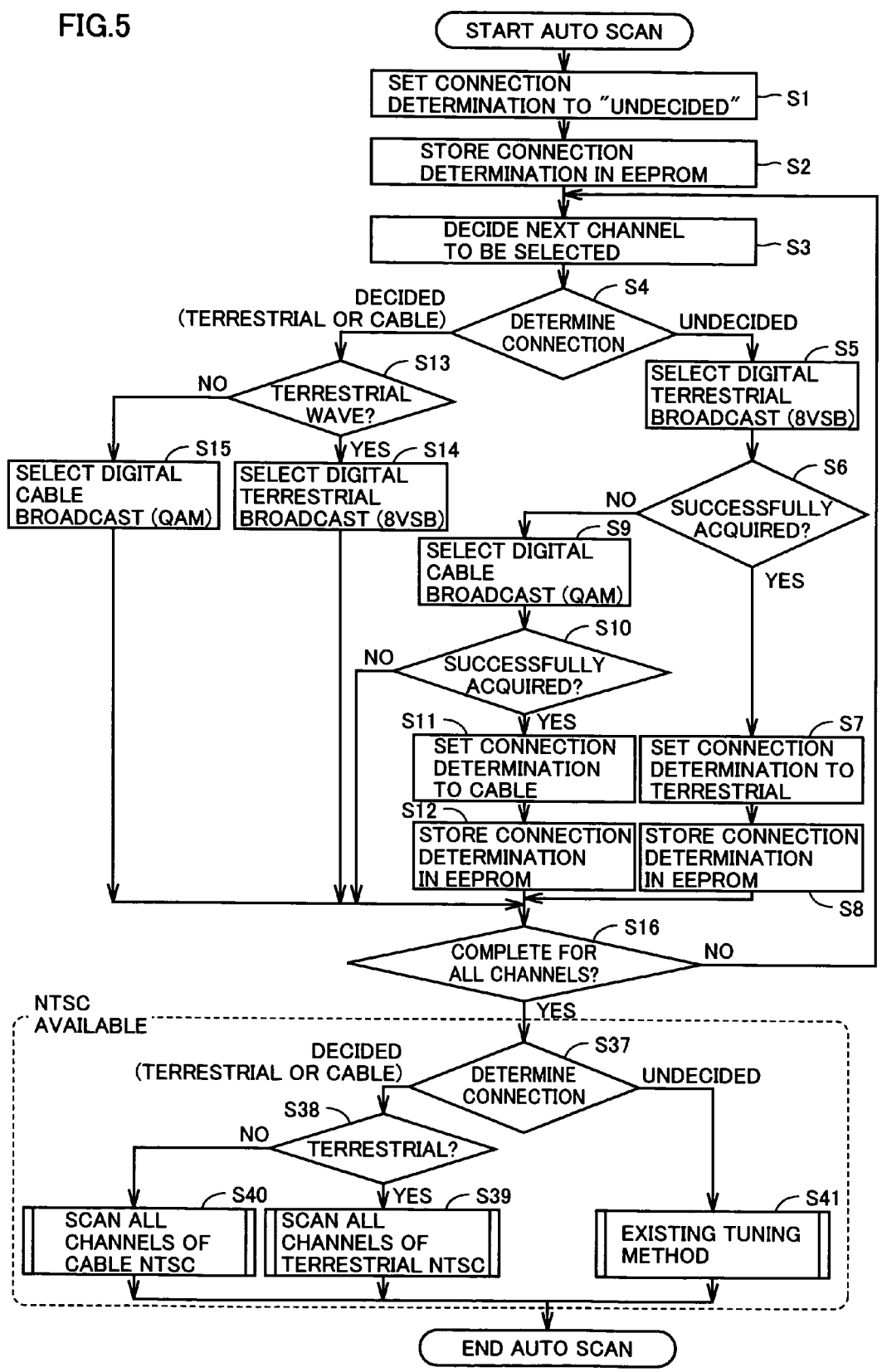
FIG. 5 is a flowchart for an auto scan operation according to an embodiment of the present invention.

In the case where connection determining data D indicates "undecided", the auto scan operation in FIG. 5, for example, is not executed, and therefore the connection mode of broadcast receiving apparatus 1 not decided. Then, the tuning process for all the conceivable connection modes is executed. Specifically, CPU 6 first reads tuning information 41 indicated by channel number 40 corresponding to the designated channel from table TB1, and applies it to tuner 22. Tuner 22 thus executes the tuning process based on applied tuning information 41 (S29). In the case where acquisition result information 44 indicates the successful acquisition of the 8VSB signal (YES in S30) in the process, the tuning process is terminated.

In the case where acquisition result information 44 fails to indicate the successful acquisition of the 8VSB signal (NO in S30), on the other hand, the CPU 6 reads tuning information 41 indicated by channel number 40 corresponding to the designated channel from table TB2 and applies it to tuner 32. Tuner 32 thus executes the tuning process based on applied tuning information 41 (S31). In the case where acquisition result information 44 indicates the successful acquisition of the QAM signal (YES in S32) in the process, the tuning process is terminated.

In the case where acquisition result information 44 fails to indicate the successful acquisition of the QAM signal (NO in S32), on the other hand, CPU 6 reads tuning information 41 indicated by channel number 40 corresponding to the designated channel from table TB3 and applies it to analog type tuner 4. Analog type tuner 4 thus executes the tuning process for the analog terrestrial broadcast based on applied tuning information 41 (S33). In the case where acquisition result information 44 indicates the successful acquisition of the NTSC signal (YES in S34) in the process, the tuning process is terminated.

In the case where acquisition result information 44 fails to indicate the successful acquisition of the NTSC signal (NO in S34), CPU 6 reads tuning information 41 indicated by channel number 40 corresponding to the designated channel from table TB4 and applies it to analog type tuner 4. Analog type tuner 4 thus executes the tuning process for the analog CATV broadcast based on applied tuning information 41 (S35). After that, the tuning process is terminated.

In the case where connection determining data D indicates "terrestrial" (S21, YES in S22), the tuning process is executed for the terrestrial broadcast. First, CPU 6 reads tuning information 41 indicated by channel number 40 corresponding to the designated channel from table TB1 and applies it to tuner 22. Tuner 22 executes the tuning process based on applied tuning information 41 (S23). In the case where acquisition result information 44 indicates the successful acquisition of the 8VSB signal (YES in S24), the tuning process is terminated.

In the case where acquisition result information 44 fails to indicate the successful acquisition of the 8VSB signal (NO in S24), on the other hand, CPU 6 reads tuning information 41 indicated by channel number 40 corresponding to the designated channel from table TB3 and applies it to analog type tuner 4. Analog type tuner 4 thus executes the tuning process for the terrestrial broadcast based on applied tuning information 41 (S25). After that, the tuning process is terminated.

In the case where connection determining data D indicates "cable" (S21, NO in S22), the tuning process is executed for the CATV broadcast. First, CPU 6 reads tuning information 41 indicated by channel number 40 corresponding to the designated channel from table TB2 and applies it to tuner 32. Tuner 32 executes the tuning process based on applied tuning information 41 (S26). In the case where acquisition result information 44 indicates the successful acquisition of the QAM signal (YES in S27), the tuning process is terminated.

In the case where acquisition result information 44 fails to indicate the successful acquisition of the QAM signal (NO in S27), CPU 6 reads tuning information 41 indicated by channel number 40 corresponding to the designated channel from table TB4 and applies it to analog type tuner 4. Analog type tuner 4 thus executes the tuning process based on applied tuning information 41 (S28). After that, the tuning process is ended.

Figure 6:
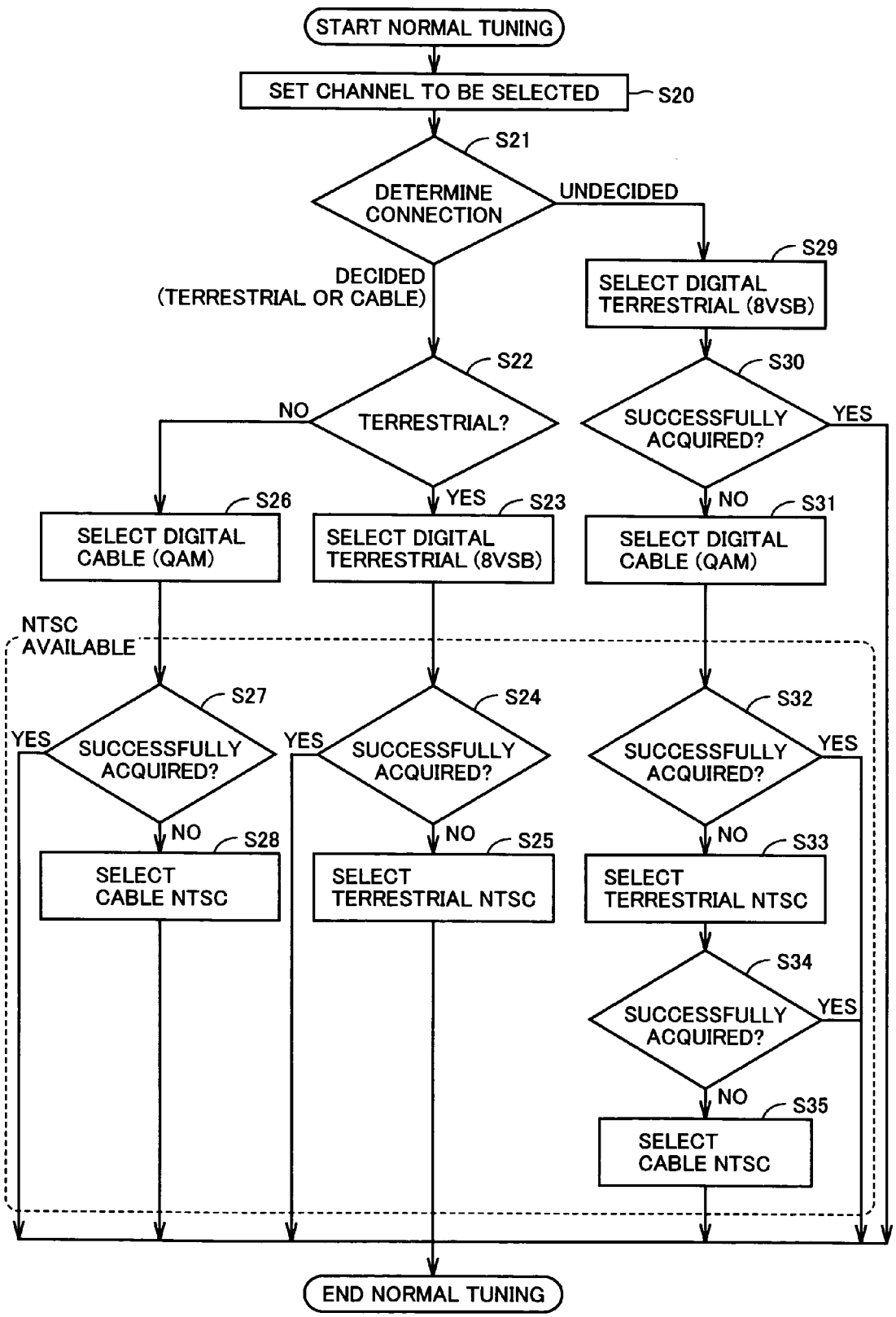
FIG. 6 is a flowchart for a normal tuning process according to an embodiment of the present invention.

Also in the tuning process shown in FIG. 6, tunability data 42 is outputted to CPU 6, but not stored in tables TB1 to TB4.

As described above, in the case where connection determining data D indicates "undecided", i.e., in the case where the auto scan operation shown in FIG. 5 has yet to be performed and the connection mode of broadcast receiving apparatus 1 is not determined, the normal tuning process is executed with a conceivable connection mode, i.e., for both the terrestrial broadcast and the CATV broadcast (S29 to S35). In the case where connection determining data D indicates "terrestrial" or "cable", i.e., in the case where the auto scan operation shown in FIG. 5 has already been carried out and the connection mode for broadcast receiving apparatus 1 is determined, on the other hand, the normal tuning process is executed only for the determined connection mode, i.e., one of the terrestrial broadcast and the CATV broadcast (S22 to S28). In this case, the tuning process can be executed at higher speed than in the case where connection determining data D indicates "undecided".

The determination in steps S27 and S24 in FIG. 6 may be carried out in the following manner. Specifically, in the case where connection determining data D fails to indicate "undecided" and the auto scan operation in FIG. 5 has been executed already, tunability data 42 corresponding to the channels indicated by channel number 40 of tables TB1 and TB2 indicate "tunable" or "untunable". In the determination of step S24, therefore, the process of step S25 is executed in the case where tunability data 42 of channel number 40 corresponding to the designated channel in table TB1 indicates "untunable", while the tuning process is terminated in the case where tunability data 42 indicates "tunable". Alternatively, in the determination of step S27, assume that tunability data 42 of channel number 40 corresponding to the designated channel in table TB2 indicates "untunable" and the tuning process in step S28 is executed, while the process is terminated in the case where tunability data 42 indicates "tunable".

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A receiving apparatus comprising:
   a digital terrestrial wave processing unit for processing a received broadcast signal as required for digital terrestrial broadcast;
   a digital cable processing unit for processing a received broadcast signal as required for digital cable broadcast;
   a memory unit for storing an indicator associated with a received broadcast signal, wherein the indicator is initially set to indicate an undetermined status;
   a determining unit for determining, for a selected received broadcast signal, whether the received broadcast signal is for said digital terrestrial broadcast or for said digital cable broadcast, based on a waveform characteristic of the received broadcast signal,
       wherein the indicator associated with the selected received broadcast signal and stored in the memory unit is updated in accordance with the determination by the determining unit; and
   a control unit,
       wherein said control unit comprises means for causing one selected from a group consisting of said digital terrestrial wave processing unit and said digital cable processing unit to execute said processing, based on the updated indicator associated with the selected received broadcast signal after determination by the determining unit and stored in the memory unit, and
       wherein, for a non-selected received broadcast signal, said control unit comprises means for executing processing by the digital terrestrial wave processing unit and the digital cable processing unit in a sequential order,
   wherein operation of the determining unit is terminated when the indicator is stored in the memory unit from a prior determination.

2. The receiving apparatus according to claim 1, wherein said waveform characteristic corresponds to the type of modulation of said broadcast signal.

3. The receiving apparatus according to claim 2, further comprising:
   an analog processing unit for processing a received broadcast signal as required for analog broadcast, wherein
   said control unit further comprises means for causing said analog processing unit to execute one selected from a group consisting of the signal processing for an analog terrestrial broadcast and the signal processing for an analog cable broadcast, based on a result of determination by said determining unit.

4. The receiving apparatus according to claim 3, wherein said processing comprises a tuning process.

5. The receiving apparatus according to claim 4, wherein said tuning process is executed for all channels.

6. The receiving apparatus according to claim 5, wherein said tuning process is executed for one desired channel.

7. The receiving apparatus according to claim 6, wherein said processing comprises a process of converting said broadcast signal which has been subjected to said tuning process into signal viewable though a television receiver which has been prepared in advance, and
   said receiving apparatus and said television receiver are integrally configured.

8. The receiving apparatus according to claim 1, further comprising:
an analog processing unit for processing a received broadcast signal as required for analog broadcast, wherein
said control unit further comprises means for causing said analog processing unit to execute one of the signal processing for an analog terrestrial broadcast and the signal processing for an analog cable broadcast, based on a result of determination by said determining unit.

9. The receiving apparatus according to claim 1, wherein said processing comprises a tuning process.

10. The receiving apparatus according to claim 9, wherein said tuning process is executed for all channels.

11. The receiving apparatus according to claim 9, wherein said tuning process is executed for one desired channel.

12. The receiving apparatus according to claim 9, wherein said processing comprises a process of converting said broadcast signal which has been subjected to said tuning process into a signal viewable through a television receiver which has been prepared in advance, and
said receiving apparatus and said television receiver are integrally configured.

13. A television set equipped with a receiving apparatus, comprising a television receiver for viewing television broadcast, wherein
said receiving apparatus comprises:
a digital terrestrial wave processing unit for processing a received broadcast signal as required for digital terrestrial broadcast;
a digital cable wave processing unit for processing a received broadcast signal as required for digital cable broadcast;
an analog processing unit for processing a received broadcast signal as required for analog broadcast;
a memory unit for storing an indicator associated with a received broadcast signal, wherein the indicator is initially set to indicate an undetermined status;
a determining unit for determining, for a selected received broadcast signal, whether a received broadcast signal is for said digital terrestrial broadcast, for said digital cable broadcast, for an analog terrestrial broadcast, or for an analog cable broadcast, based on a waveform characteristic corresponding to the type of modulation of the broadcast signal,
wherein the indicator associated with the selected received broadcast signal and stored in the memory unit is updated in accordance with the determination by the determining unit, and
wherein operation of the determining unit is terminated when the indicator is stored in the memory unit from a prior determination; and
a control unit, said control unit comprises:
means for causing one of said digital terrestrial processing unit and said digital cable processing unit to execute said processing, based on the updated indicator associated with the selected received broadcasting signal after determination by the determining unit and stored in the memory unit; and
means for causing said analog processing unit to execute one of the signal processing for the analog terrestrial broadcast and the processing for the analog cable broadcast, based on the updated indicator associated with the selected received broadcasting signal after determination by the determining unit and stored in the memory unit,
wherein, for a non-selected received broadcast signal, said control unit comprises means for executing processing by the digital terrestrial wave processing unit, the digital cable processing unit, the analog processing unit for the analog terrestrial broadcast, and the analog processing unit for the analog cable broadcast in a sequential order,
said processing comprises a tuning process,
said tuning process is executed for all channels or one desired channel, and
said processing comprises a processing of converting said broadcast signal which has been subjected to said tuning process into a signal viewable through said television receiver.

14. The receiving apparatus according to claim 5, wherein the tuning process is executed for all channels in an auto scan prior to the control unit causing one selected from a group consisting of said digital terrestrial wave processing unit and said digital cable processing unit to execute said processing.

* * * * *